No. 726,942. PATENTED MAY 5, 1903.
W. F. KEYES.
FASTENING DEVICE.
APPLICATION FILED JUNE 12, 1902.
NO MODEL.
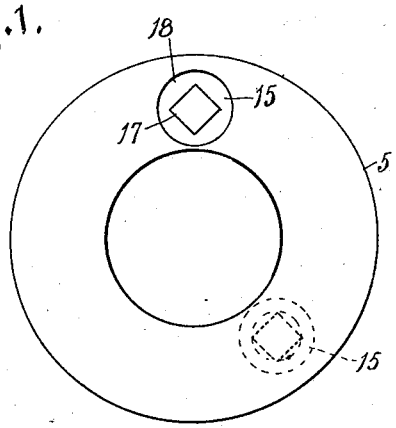
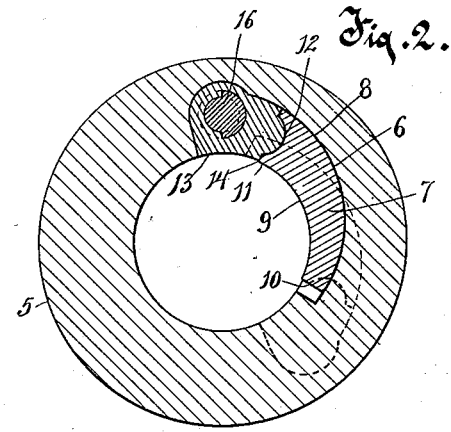
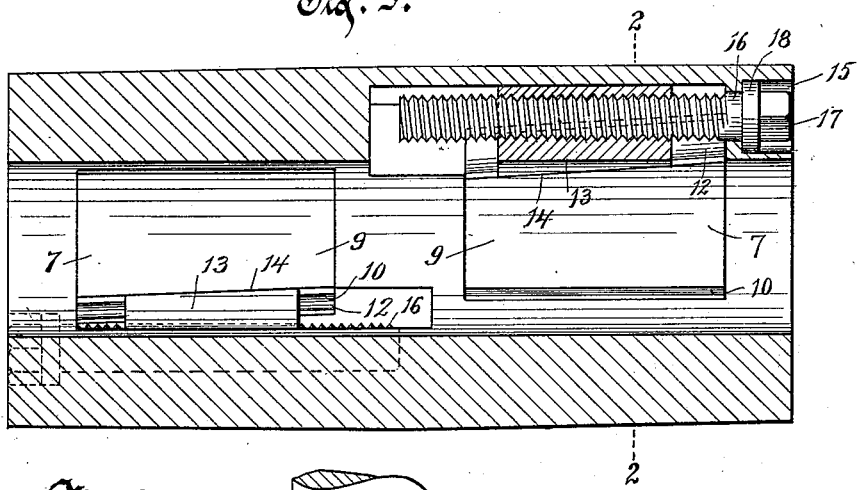
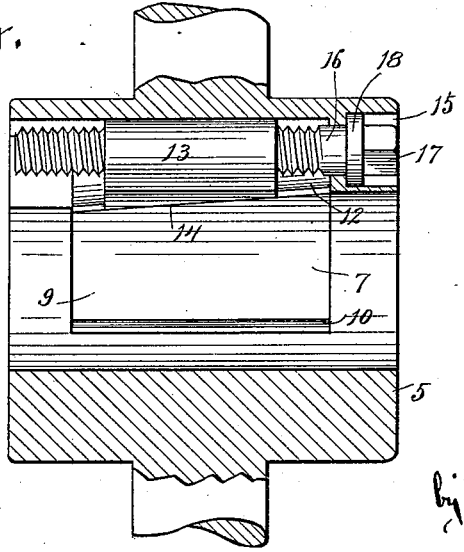
Witnesses. Inventor.
Walter F. Keyes No. 726,942. Patented May 5, 1903.

UNITED STATES PATENT OFFICE.

WALTER F. KEYES, OF SOUTH MILWAUKEE, WISCONSIN.

FASTENING DEVICE.

SPECIFICATION forming part of Letters Patent No. 726,942, dated May 5, 1903.

Application filed June 12, 1902. Serial No. 111,232. (No model.)

*To all whom it may concern:*

Be it known that I, WALTER F. KEYES, residing at South Milwaukee, in the county of Milwaukee and State of Wisconsin, have invented a new and useful Improvement in Fastening Devices, of which the following is a description, reference being had to the accompanying drawings, which are a part of this specification.

This invention relates to improvements in fastening devices, and more particularly to improvements in devices for coupling or fastening two sections of line-shaft together, a set-collar to a shaft or similar cylindrical object, or a pulley or wheel to a shaft.

The object of this invention is to produce a fastening device or devices the principle of which may be utilized either for fastening set-collars to shafts, pulleys or wheels to shafts, or in a coupling for two sections of line-shaft.

A further object of this invention is to produce a simple cheaply-constructed fastening device which will necessitate no protruding parts, such as set-screws, which may be easily and quickly applied, and which will comprise maximum fastening qualities for a minimum size. This and other objects I attain by means of the parts constructed and arranged as described in the specification and illustrated in the drawings presented herewith, in which—

Figure 1 is an end view of a shaft-coupling embodying this invention. Fig. 2 is a cross-sectional view of said shaft-coupling, taken on line 2 2 in Fig. 3. Fig. 3 is a longitudinal sectional view of a shaft-coupling embodying this invention, and the circumference of the same is shown crowned for a belt. Fig. 4 is a longitudinal sectional view of a pulley-hub embodying this invention, showing portions of spokes attached thereto, and this view may be taken as a view of a set-collar if the spokes were removed.

Throughout the several views like elements are denoted by like characters.

Whether the device is used for a shaft-coupling, set-collar, or pulley-hub the essential features will remain the same, and for the sake of simplicity a set-collar or pulley-hub, as illustrated in Fig. 4, will be described, and this consists of a sleeve-like portion 5 of any suitable diameter and formed with an internal bore adapted to snugly fit over the shaft to which the collar or pulley is to be fastened. The sleeve, aside from the internal bore or shaft-passage, is chambered out to receive the movable parts of the fastening device. The back wall 6 of the chambered-out portion is formed eccentric with the walls of the shaft-passage, as shown in Fig. 2, and preferably straight from end to end. A tapered wedging member 7, having its outer face 8 formed to conform to the curve of back wall 6 of the chambered-out portion, has its inner face 9 formed concentric with the walls of the shaft-passage, and when said wedging member is in inoperative position it will be out of contact with the shaft in its passage. The ends of the wedge 7 preferably stand at right angles to the axis of the shaft and slidably fit against the end walls of the chambered-out portion. Between the smaller end 10 of the wedge and the end of the chambered-out portion adjacent thereto a space exists to allow the wedge to be moved circumferentially of the shaft. The larger edge 11 of the wedge 7 is tapered, as shown in Figs. 3 and 4, and provided with a channel 12, extending from end to end of the wedge. A wedge 13, movable longitudinally of the shaft, lies within the channeled-out portion and is provided with a beveled face 14, formed to lie within and coact with the beveled face of the wedge 7. The sleeve 5 in line with wedge 13 is counterbored, as shown at 15, to receive the head of a screw 16, which passes through an opening therefor in the sleeve in the rear of the counter-bore and through a threaded opening or passage extending through wedge 13. Between the head 17 of the screw and the rear wall of the counter-bore the screw is provided with a shouldered portion 18 to prevent the screw from moving into the sleeve.

It will be seen that when the screw 16 is drawn up so that wedge 13, Fig. 4, moves to the right it will force wedge 7 circumferentially of the shaft and move it into the shaft-passage, and as wedge 7 is prevented from moving longitudinally the collar or pulley will be securely locked to the shaft.

When the device is to be used in a shaft-coupling, two fastening devices such as described will be utilized, as shown in Fig. 3, and the screws 16 will lie on opposite sides or extend into the sleeve from opposite ends.

It will be seen that if two shafts of different diameters are to be coupled the coupling, or rather the shaft-passage, may be formed with two diameters to accommodate the diameters of the shafts, and thus substantially perfect alinement of the shafts be accomplished.

The dimensions, forms, and arrangement of the several elements forming the fastening device may be varied without departing from the spirit of my invention so long as the device comprises a wedge movable circumferentially of the shaft and another wedge acting on the first-mentioned wedge for forcing it into position.

What I claim as my invention is—

1. A device of the character described, comprising a shell having a shaftway therethrough concentric with its periphery, a recess off of said shaftway the outer face of which is eccentric to said way, a wedge fitting between said eccentric face and the shaftway and movable circumferentially of said way, another wedge bearing against the first-mentioned wedge and movable longitudinally of said way, and a screw for moving said last-mentioned wedge.

2. In combination with a shaft, a shell having a channel for the shaft extending therethrough concentrically with said shaft, a recess or pocket in said shell joining said channel and having a wall thereof eccentric to the shaft, a wedge located within said recess and movable circumferentially of the shaft, a second wedge within said recess movable longitudinally of said shaft, and means for moving said second wedge.

In testimony whereof I affix my signature in presence of two witnesses.

WALTER F. KEYES.

Witnesses:
ANNA V. FAUST,
JNO. S. GREEN.